United States Patent
Yonezawa

(10) Patent No.: US 10,444,839 B2
(45) Date of Patent: Oct. 15, 2019

(54) TERMINAL, AND IMAGE PICKUP APPARATUS INCLUDING THE SAME

(71) Applicant: CANON KABUSHIKI KAISHA, Tokyo (JP)

(72) Inventor: Takeshi Yonezawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/298,613

(22) Filed: Oct. 20, 2016

(65) Prior Publication Data
US 2017/0123497 A1 May 4, 2017

(30) Foreign Application Priority Data
Oct. 30, 2015 (JP) .................................. 2015-214419

(51) Int. Cl.
*H04N 5/232* (2006.01)
*G06F 3/00* (2006.01)
(Continued)

(52) U.S. Cl.
CPC ............ *G06F 3/016* (2013.01); *G06F 3/0416* (2013.01); *G06F 3/0482* (2013.01); *G06F 3/0486* (2013.01); *G06F 3/04817* (2013.01); *G06F 3/04845* (2013.01); *G06F 3/04847* (2013.01); *G06F 3/04883* (2013.01);
(Continued)

(58) Field of Classification Search
CPC ........... H04N 5/23203; H04N 5/23212; H04N 5/23216; H04N 5/23296; G06F 3/016; G06F 3/05847; G06F 2203/04809; G06F 3/0486; G06F 3/0416; G06F 3/04817; G06F 3/0482; G06F 3/04845; G06F 3/04883; G06F 3/04847; G06F 2203/014
See application file for complete search history.

(56) References Cited

U.S. PATENT DOCUMENTS

| 8,547,339 B2 | 10/2013 | Ciesla |
| 2005/0057528 A1 | 3/2005 | Kleen |

(Continued)

FOREIGN PATENT DOCUMENTS

| JP | H06332601 A | 12/1994 |
| JP | 2005078644 A | 3/2005 |

(Continued)

OTHER PUBLICATIONS

Office Action issued in Japanese Appln. No. 2015-214419 dated Apr. 11, 2019.

*Primary Examiner* — Jason A Flohre
(74) *Attorney, Agent, or Firm* — Rossi, Kimms & McDowell LLP

(57) ABSTRACT

A terminal according to the present invention includes: a display which detects an operation on a display surface, and deforms part of the display surface; and a controller which carries out at least one of a first control in response to a drag operation of an icon displayed on the display surface so that a place in the display surface to which the icon is not allowed to move is deformed to have a shape different from that of another place and a second control in response to a swipe operation on the display surface so that an end portion of the display surface in a direction of a swipe operation is deformed to have a shape different from that of another place.

14 Claims, 16 Drawing Sheets

(51) Int. Cl.
  *G06F 3/01* (2006.01)
  *G06F 3/041* (2006.01)
  *G06F 3/0481* (2013.01)
  *G06F 3/0482* (2013.01)
  *G06F 3/0484* (2013.01)
  *G06F 3/0488* (2013.01)
  *G06F 3/0486* (2013.01)

(52) U.S. Cl.
  CPC ..... *H04N 5/23203* (2013.01); *H04N 5/23212* (2013.01); *H04N 5/23216* (2013.01); *H04N 5/23296* (2013.01); *G06F 2203/014* (2013.01); *G06F 2203/04809* (2013.01)

(56) References Cited

U.S. PATENT DOCUMENTS

| | | | | |
|---|---|---|---|---|
| 2009/0303373 A1* | 12/2009 | Yamada | ............. | H04N 5/23216 348/333.02 |
| 2010/0134433 A1* | 6/2010 | Miyanishi | ............. | G03B 19/00 345/173 |
| 2010/0162109 A1* | 6/2010 | Chatterjee | ............... | G06F 3/016 715/702 |
| 2011/0254672 A1* | 10/2011 | Ciesla | ................... | G06F 3/016 340/407.2 |
| 2012/0140102 A1* | 6/2012 | Park | .................... | G06F 3/04817 348/333.02 |
| 2014/0006985 A1* | 1/2014 | Matsushima | ....... | G06F 3/04883 715/765 |
| 2014/0078370 A1* | 3/2014 | Yoshimi | ................ | G06F 3/0488 348/333.01 |
| 2014/0354845 A1* | 12/2014 | Molgaard | .............. | H04N 1/215 348/222.1 |
| 2015/0077364 A1* | 3/2015 | Parthasarathy | ......... | G06F 3/016 345/173 |
| 2015/0177906 A1* | 6/2015 | Yairi | ................... | G06T 3/0006 345/648 |
| 2015/0253925 A1* | 9/2015 | Nakao | ................. | G06F 3/04883 345/173 |
| 2016/0373654 A1* | 12/2016 | Kwon | .................. | H04N 5/2251 |
| 2017/0017355 A1* | 1/2017 | Lim | ...................... | G06F 3/0482 |
| 2017/0068424 A1* | 3/2017 | Hong | ................. | G06F 3/04842 |

FOREIGN PATENT DOCUMENTS

| | | |
|---|---|---|
| JP | 2011508935 A | 3/2011 |
| JP | 2013203155 A | 10/2013 |
| JP | 2014174913 A | 9/2014 |

\* cited by examiner

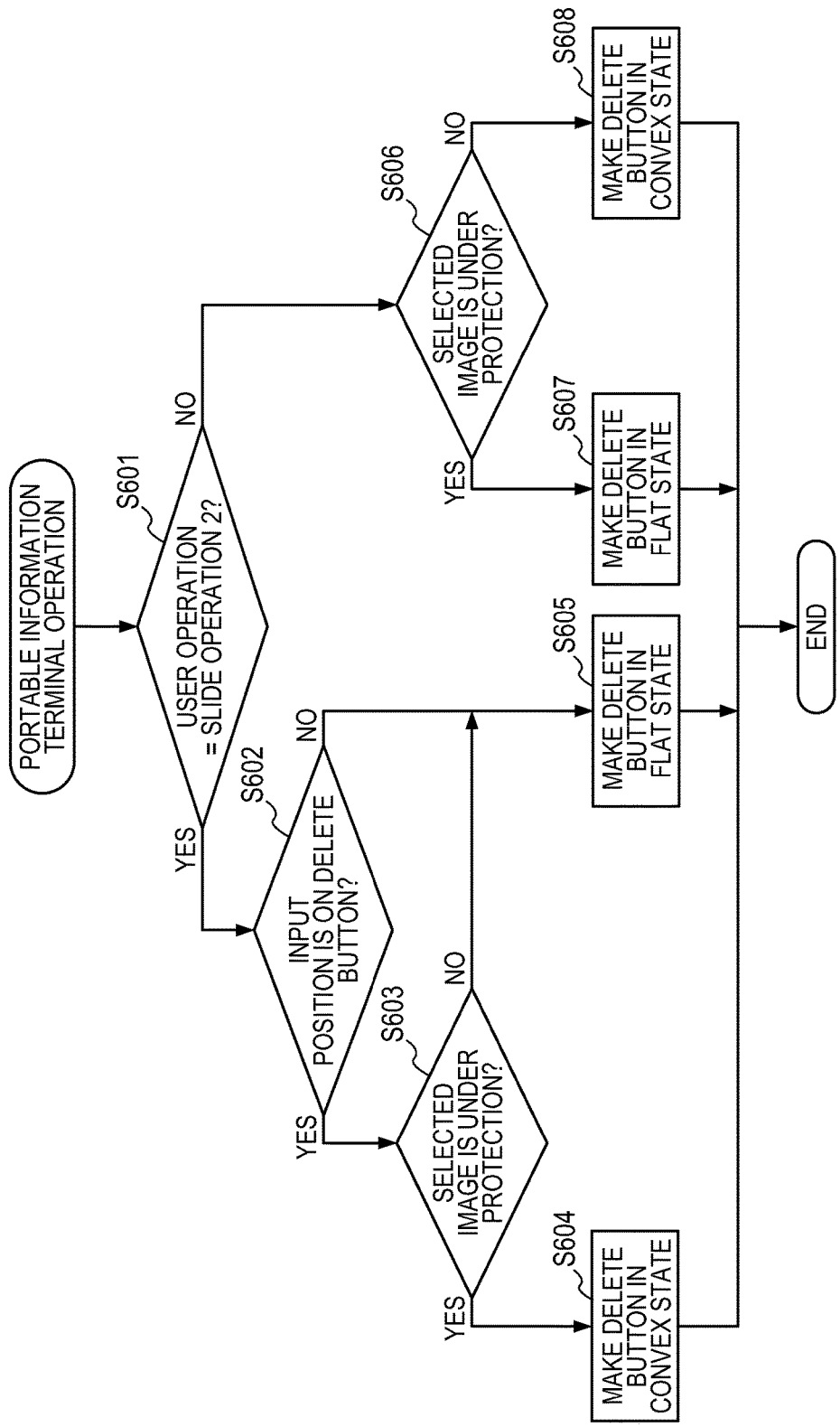

```
Camera
├─Group 01
│   ├─Photo 0101
│   └─Photo 0102
├─Group 02
│   ├─Photo 0201
│   ├─Photo 0202
│   └─Photo 0203
└─Group 03
    ├─Photo 0301
    └─Photo 0302
```

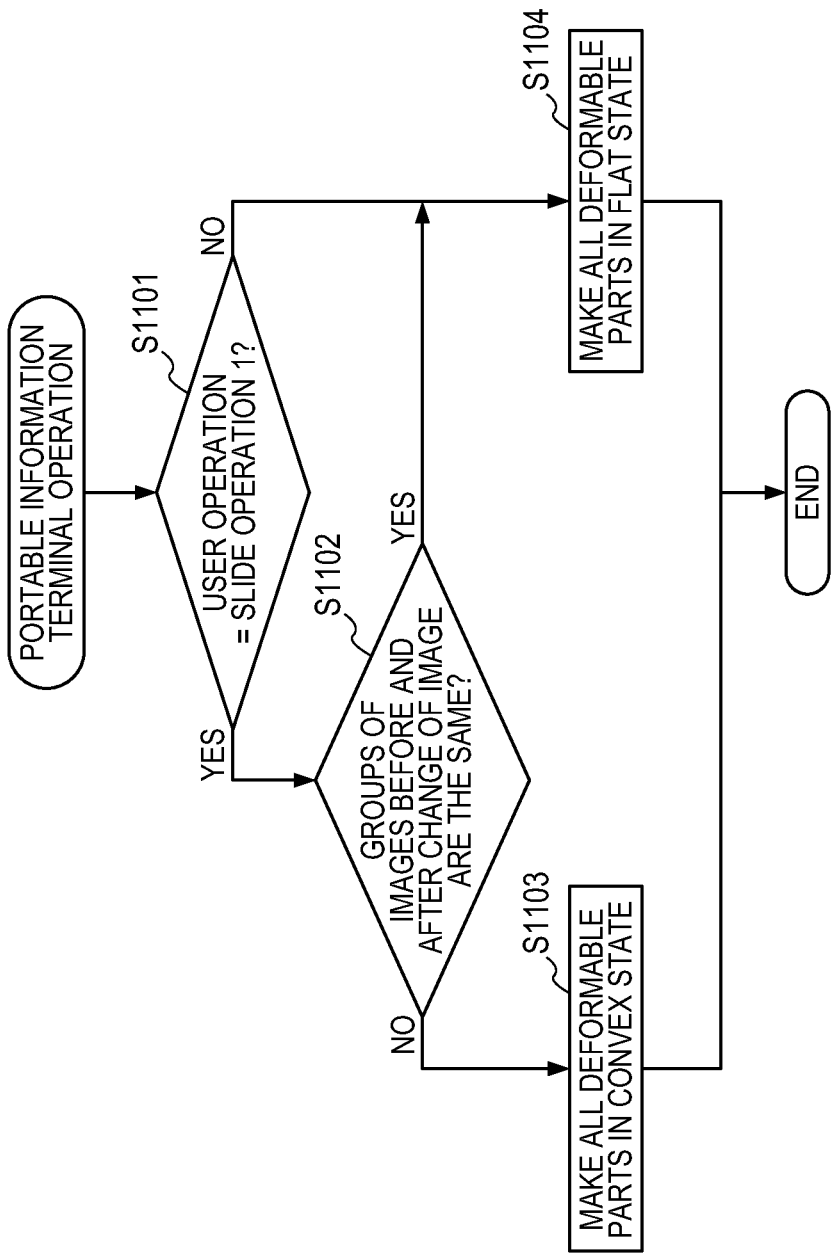

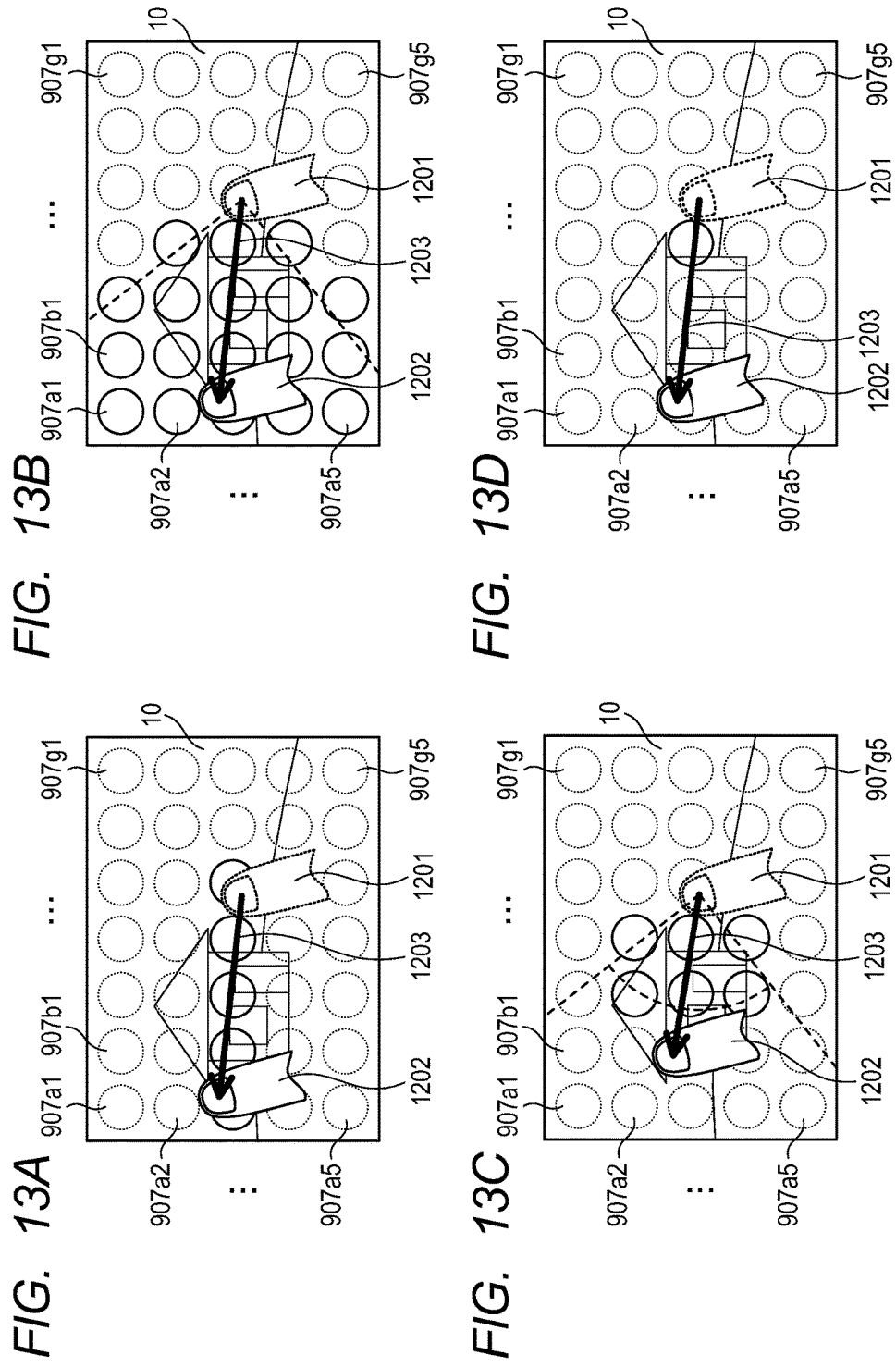

TERMINAL, AND IMAGE PICKUP APPARATUS INCLUDING THE SAME

BACKGROUND OF THE INVENTION

Field of the Invention

The present invention relates to a terminal. Particularly, the present invention relates to: a terminal including a touch detector; and an image pickup apparatus which include the terminal.

Description of the Related Art

A conventional information display/input apparatus in which a so-called touch panel is placed on a display such as a liquid crystal panel displays, for example, images of virtual buttons and others on a display screen. In this condition, the user can input or select information assigned to any of the virtual buttons by touching a touch panel area corresponding to a place of the virtual button displayed, with the fingertip or the pen point of a stylus pen. The surface shape of such a touch panel is almost flat, and the user input depends on visual guidance. For this reason, the user cannot distinguish mutually-adjacent buttons by a tactile feel, and essentially has difficulty in inputting data correctly. Against this background, user interfaces capable of providing tactile guidance have been proposed.

For example, Japanese Patent Application Laid-Open No. 2011-508935 discloses a user interface capable of giving the tactile guidance to the user by: expanding cavities under the surface layer; and thereby deforming specific areas of the surface.

Furthermore, Japanese Patent Application Laid-Open No. H06-332601 discloses a ruggedness shape displaying apparatus including: multiple ruggedness shape outputting elements which are arranged between flexible sheets, and are configured to reversibly expand and contract under the control according to a signal; and terminals for controlling the respective ruggedness shape outputting elements from the outside.

The conventional techniques disclosed by Japanese Patent Application Laid-Open No. 2011-508935 and Japanese Patent Application Laid-Open No. H06-332601, however, still require the user to, after operating the apparatus with the fingertip or the pen point of the stylus pen, visually check the display in order to recognize whether or not the apparatus performs the intended operation.

Further features of the present invention will become apparent from the following description of exemplary embodiments with reference to the attached drawings.

SUMMARY OF THE INVENTION

An object of the present invention is to provide: a terminal which uses a deformable part configured to change an operated surface shape, and which is thereby capable of informing the user by changing operation feel of the fingertip, stylus pen, etc. operating the surface; and an image pickup apparatus which includes terminal.

A terminal according to the present invention includes: a display which detects an operation on a display surface and deforms part of the display surface; and a controller which carries out at least one of a first control in response to a drag operation of an icon displayed on the display surface so that a place in the display surface to which the icon is not allowed to move is deformed to have a shape different from that of another place and a second control in response to a swipe operation on the display surface so that an end portion of the display surface in a direction of a swipe operation is deformed to have a shape different from that of another place.

The present invention can provide: the terminal which uses the deformable part, and which is capable of informing the user by changing tactile feel of the operating fingertip, stylus pen, etc.; and the image pickup apparatus which includes the terminal.

Further features of the present invention will become apparent from the following description of exemplary embodiments with reference to the attached drawings.

BRIEF DESCRIPTION OF THE DRAWINGS

FIG. 6 is a flowchart illustrating how the tactile user interface works in response to the user's operation in the first embodiment.

FIG. 11 is a flowchart illustrating how the tactile user interface works in response to the user's operation in the second embodiment.

FIG. 13A is a diagram illustrating how the tactile user interface works in response to the user's operation in the second embodiment.

FIG. 13B is a diagram illustrating how the tactile user interface works in response to the user's operation in the second embodiment.

FIG. 13C is a diagram illustrating how the tactile user interface works in response to the user's operation in the second embodiment.

FIG. 13D is a diagram illustrating how the tactile user interface works in response to the user's operation in the second embodiment.

DESCRIPTION OF THE EMBODIMENTS

Preferred embodiments of the present invention will now be described in detail in accordance with the accompanying drawings.

First Embodiment

Referring to FIGS. 1 to 8D, descriptions will be hereinbelow provided for an operation apparatus (user interface apparatus) of a first embodiment of the present invention. In this embodiment, the user interface apparatus will be described using an example of a user interface for an image managing function of a digital camera 1 which is an image pickup apparatus including an image pickup element for receiving an object light from an image pickup optical system. It should be noted that the term "operation apparatus" used in the embodiments may be interchangeable with a terminal, a handy terminal, a mobile terminal, a digital camera, a computer, a display (for a computer), and the like.

Figure 1:
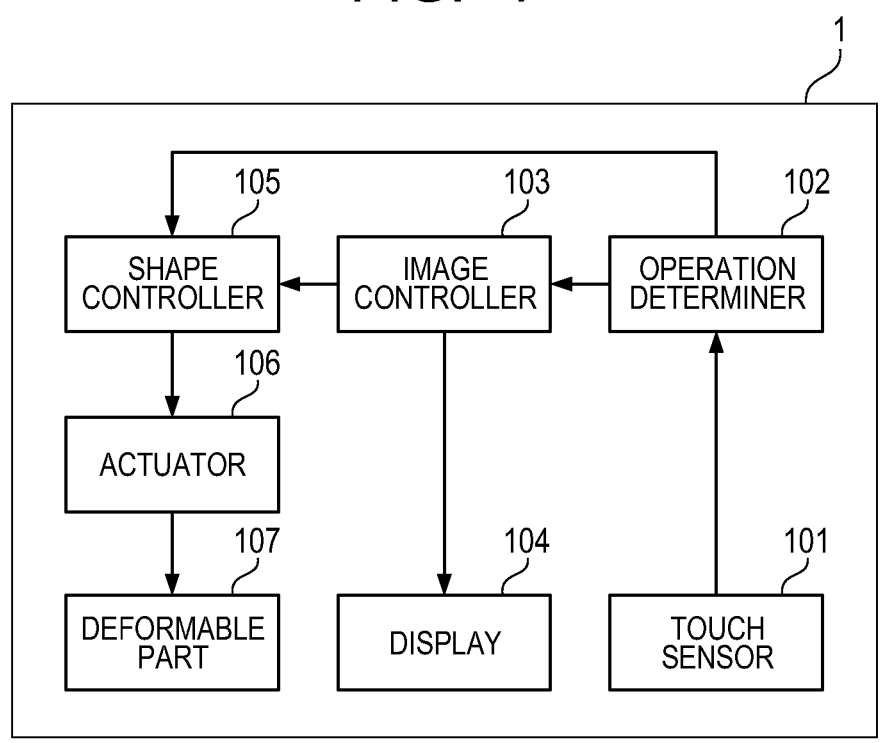
FIG. 1 is a configuration diagram illustrating an operation apparatus of a first embodiment.

FIG. 1 illustrates a configuration of the user interface apparatus of the first embodiment of the present invention.

A touch sensor (detector) 101 is, for example, a conventional capacitance type touch sensor to be mounted on a display surface of a display unit. The touch sensor 101 detects user inputs based on changes in the electrostatic capacity which are caused by a nearing fingertip or a nearing pen point of a stylus pen. In other words, touch onto a display 104 is not necessarily essential for the user inputs to be detected. Detailed descriptions will be provided later for how the user inputs are detected. Each time the user operates the user interface apparatus to make an input, an operation determiner 102 determines what type the operation is of, such as a touch operation or a slide operation, based on a pattern of the user input detected by the touch sensor 101. Detailed descriptions will be provided later for how the operation determiner 102 determines the operation type.

It should be noted that the specification defines the "slide operation" as operation with a finger or a touch pen such that: after the finger or the touch pen touches the display 104, the touch sensor 101 continues detecting the touch without interruption; and a place from which the touch sensor 101 detects the touch continuously changes. To put it more specifically, the "slide operation" is defined as operation carried out by sliding and moving a finger, a touch pen or the like on the surface of the display 104 after the finger, the touch pen or the like touches the surface of the display 104. To put it exactly, there are cases where as shown in the following embodiment, user inputs can be detected when the finger or the touch pen comes close to the surface of the display 104 even without touching the surface of the display 104. For this reason, as described above, the slide operation includes a case where after the detector makes a detection, the detection continues without interruption while the detection position continuously changes.

An image controller 103 controls an image to be displayed on the display 104 depending on the user's operation determined by the operation determiner 102. The display 104 functions to visually interface with the user. Examples of the display 104 include a conventional liquid crystal display.

A shape controller 105 controls an actuator 106 for a deformable part 107 depending on the user's operation determined by the operation determiner 102, and an image position controlled by the image controller 103. The actuator 106 is a power unit for changing the shape of the deformable part 107. The deformable part 107 is a member, configured with the touch display, for forming convex portions on the touch display. They will be described in details later.

Figure 2A:
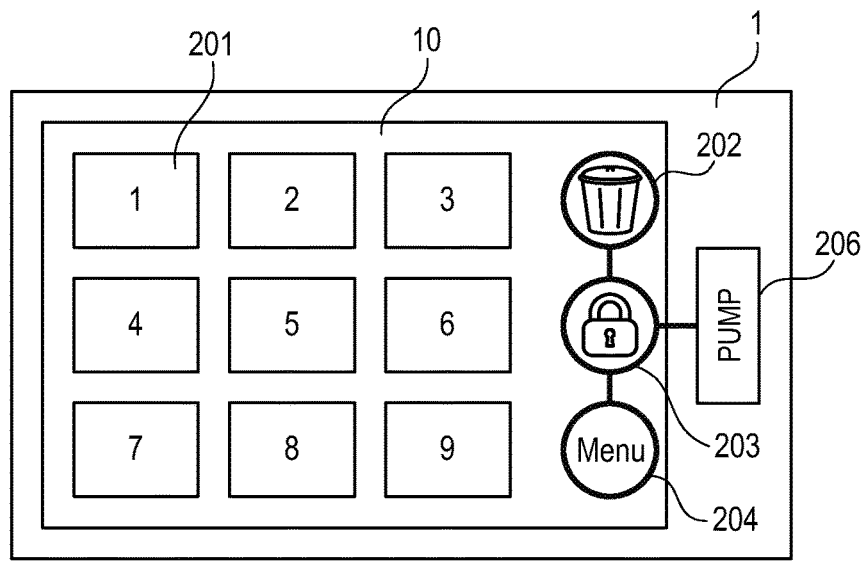
FIG. 2A is a diagram illustrating an external configuration of the operation apparatus of the first embodiment.
Figure 2B:
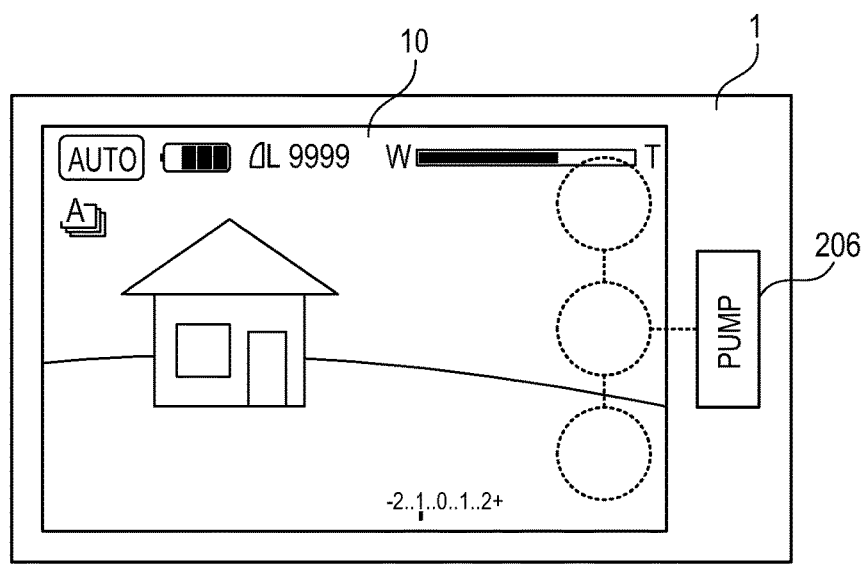
FIG. 2B is a diagram illustrating the external configuration of the operation apparatus of the first embodiment.

Next, using FIGS. 2A and 2B, descriptions will be provided for an external configuration of the digital camera 1.

FIG. 2A illustrates the user interface for an image displaying function to be performed by the digital camera 1.

The digital camera 1 includes a display screen 10. The display screen 10 includes multiple image display areas 201, a delete button 202, a protection button 203 and a menu button 204 formed thereon. The display screen 10 is a display (hereinafter referred to as a tactile user interface as well) which usually has a flat surface (a first shape), and which is capable of changing a specific area in its flat surface into a convex shape (a second shape) for the purpose of giving a tactile guidance to the user. While the image managing function of the embodiment is being performed, the tactile user interface deforms the surface of each button into the convex shape.

The image display areas 201 are areas on which to display images during the image managing function. Thumb nail images are displayed on the multiple image display areas 201. Furthermore, the image display areas 201 are each capable of receiving an input of a touch operation for selecting an image, an input of a first slide operation for changing groups of images to be displayed (also referred to as a swipe operation), and an input of a second slide operation for move an image (also referred to as a drag operation). The operations will be described in details later.

An icon representing a trash container is displayed for the delete button 202, for example. The delete button 202 is an input section for receiving an operation of deleting a selected image. An icon representing a lock is displayed for the protection button 203, for example. The protection button 203 is an input section for receiving an operation of protecting a selected image. The menu button 204 is displayed using a word "Menu". The menu button 204 is an input section for receiving an operation of displaying a menu from which to select the image managing function. Furthermore, the digital camera 1 includes a pump 206 which is an actuator connected to the buttons. The tactile user interface is capable of deforming the surface of each button into the convex shape.

Each button is capable of receiving an input both when a thumb nail image corresponding to the input is selected and pressed, and when a thumb nail image corresponding to the input is selected and moved onto the button by the second slide operation.

Furthermore, the digital camera 1 includes various functions such as an image pickup function and a setting changing function, in addition to the image managing function. According to these functions, the display screen 10 performs various displays or input detections, and changes the surface of each button into the convex shape with the assistance of the tactile user interface. In a case of a user interface for the image pickup function shown in FIG. 2B, for example, all the display screen 10 is used as a live-view display area. To this end, the display screen 10 is operated in a flat condition with the surface of any button not deformed into the convex shape by the tactile user interface. This makes it possible to use the display screen 10 to a maximum extent to check the composition and the camera's condition, and to prevent the visibility of the display screen 10 from worsening due to the convex shape which would otherwise be formed on the surface of each button.

Figure 3A:
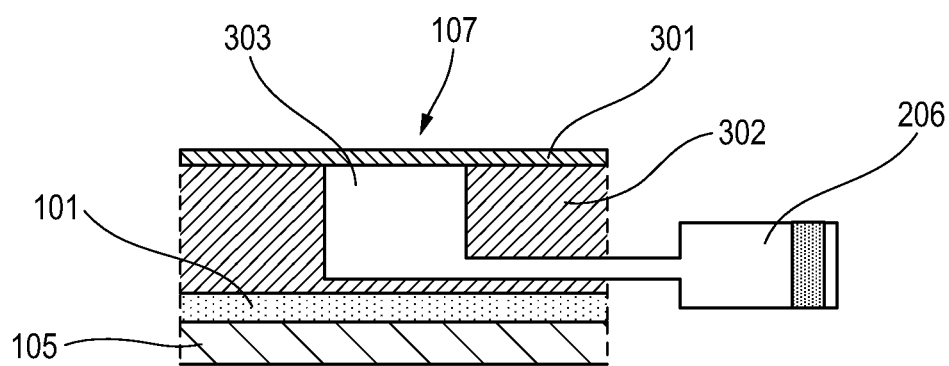
FIG. 3A is a cross-sectional configuration diagram of a tactile user interface for each button in the first embodiment.
Figure 3B:
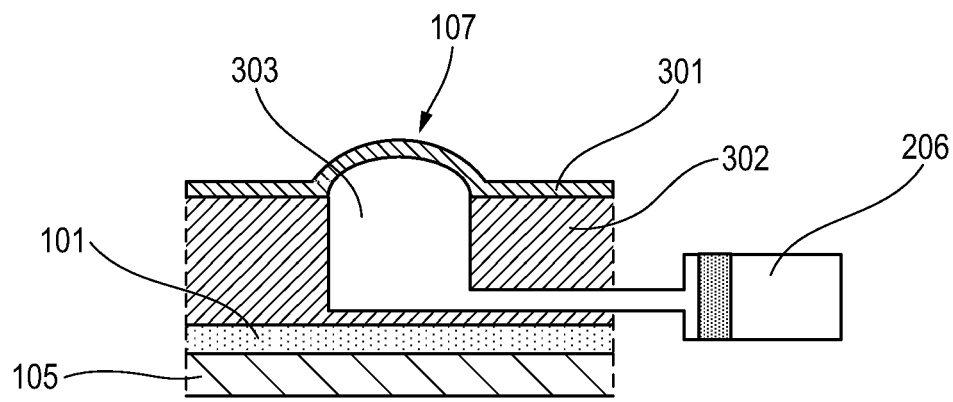
FIG. 3B is a cross-sectional configuration diagram of the tactile user interface for each button in the first embodiment.

Next, using FIGS. 3A and 3B, detailed descriptions will be provided for the actuator 106 and the deformable part 107.

FIGS. 3A and 3B are cross-sectional configuration diagrams of the tactile user interface for each button. FIG. 3A is a diagram illustrating the tactile user interface which remains in a flat condition. FIG. 3B is a diagram illustrating the tactile user interface which is deformed into the convex shape for the purpose of giving the tactile guidance to the user. Incidentally, components having the same contents as are described in FIG. 1 will be denoted by the same reference numerals, and descriptions for such components will be omitted.

The tactile user interface includes a transparent sheet 301, a transparent board 302, a cavity 303, the touch sensor 101, the display 104, and the pump 206 which is the actuator.

The transparent sheet (deformable part) 301, the cavity 303 and the pump 206 constitutes a deformable unit, which will be described later. The transparent sheet 301 is formed from a transparent elastomer material having expansible (stretchable) quality, or the like. The transparent elastomer material is preferable to have contractible (shrinkable) quality. The transparent sheet 301 is arranged provided on the surface of the display screen, and covering almost all the surface of the display screen. Furthermore, the transparent sheet 301 functions to become deformed as the cavity 303 expands due to the introducing of a fluid into the cavity 303 (the applying of pressure into the cavity 303), and to return to the normal flat condition as the cavity 303 contracts due to the discharging of the fluid from the cavity 303 (the decreasing of the pressure inside the cavity 303). The transparent board 302 functions to support the transparent sheet 301, and to at least partially define the cavity 303. It is desirable that the transparent board 302 be hard. The cavity 303 functions to hold the fluid, and to have a contracted-volume condition (a first condition) (illustrated in FIG. 3A) and an expanded-volume condition (a second condition) (illustrated in FIG. 3B). It is desirable that the fluid be a liquid. However, the fluid may be a gas or a different substance. In addition, the cavity 303 is connected to the pump 206 via a flow channel. The pump 206 functions to change the volume of the fluid inside the cavity 303. In other words, the pump 206 expands the cavity 303 from the contracted-volume condition to the expanded-volume condition, and thereby deforms a specific area of the transparent sheet 301 (an upper portion above the cavity). The change in the volume condition of the cavity 303 is achieved by: adding the fluid to the cavity 303 (making the fluid flow into the cavity 303) from the pump 206; and removing the fluid from the cavity 303 (making the fluid flow out of the cavity 303) to the pump 206. In other words, the shape controller 105 controls the pump 206, and thus changes the shape of the deformable transparent sheet 301. Thereby, the shape controller 105 is capable of changing the shape of part of the surface of the tactile user interface, that is to say, the shape of the surface (a partial area of the surface) of each button area, over the other area.

As described above, the tactile user interface is capable of forming the convex shape on the display screen 10. Because the user can press the thus-formed convex shape, combination use of the convex shape and an input graphic displayed on the display 104 makes the convex shape function as a button for showing the user where to make an input on the touch sensor 101.

Next, using FIGS. 4A, 4B, 4C and 4D, descriptions will be provided for how the touch sensor 101 detects user inputs.

Figure 4A:
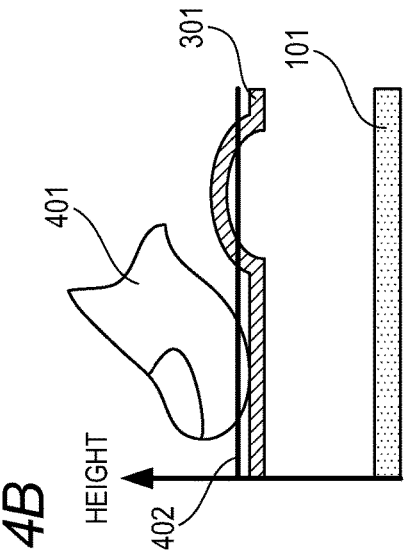
FIG. 4A is a diagram illustrating a relationship between a user input and a detection threshold in the first embodiment.
Figure 4B:
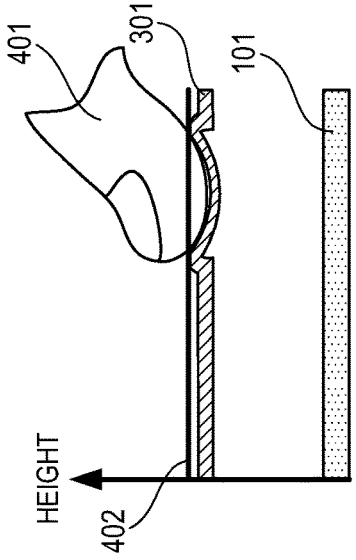
FIG. 4B is a diagram illustrating the relationship between the user input and the detection threshold in the first embodiment.
Figure 4C:
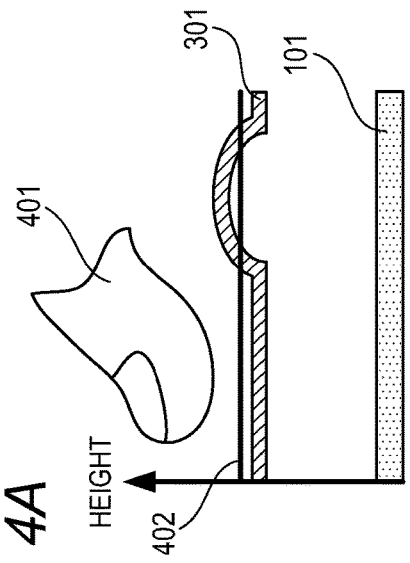
FIG. 4C is a diagram illustrating the relationship between the user input and the detection threshold in the first embodiment.
Figure 4D:
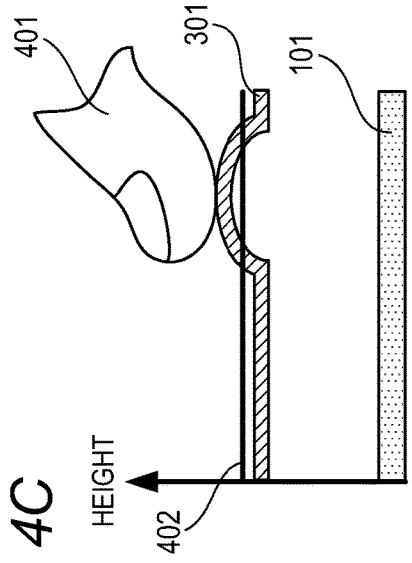
FIG. 4D is a diagram illustrating the relationship between the user input and the detection threshold in the first embodiment.

FIGS. 4A, 4B, 4C, 4D each are a diagram illustrating a relationship of a user input using a touch panel and the tactile user interface with a detection threshold for the touch sensor 101, and a cross-sectional configuration of the tactile user interface. FIG. 4A illustrates a condition where no user input is detected from an area which is not deformed into the convex shape. FIG. 4B illustrates a condition where a user input is detected from an area which is not deformed into the convex shape. FIG. 4C illustrates a condition where no user input is detected from an area which is deformed into the convex shape. FIG. 4D illustrates a condition where a user input is detected from an area which is deformed into the convex shape. The components having the same contents as are described in FIGS. 1, 3A and 3B are denoted by the same reference numerals. Descriptions for such components will be omitted.

A fingertip 401 is shown as a fingertip with which the user operates the tactile user interface, and as operating the tactile user interface for an input purpose.

The detection threshold 402 is shown as a threshold for determining whether to detect a user input in comparison with the height of the fingertip which is obtained from the amount of change in capacitance detected by the touch sensor 101.

The detection threshold 402 is set lower than the height of the convex shape but higher than the flat surface throughout the tactile user interface. When the height of the fingertip 401 is lower than the detection threshold 402 (or close to the touch sensor 101), the tactile user interface recognizes that it is operated, and thus detects the user input.

FIG. 4A illustrates the condition where the tactile user interface is not touched by the fingertip. In this case, since the fingertip 401 is higher than the detection threshold 402, no user input is detected. FIG. 4B illustrates the condition where the flat surface of the tactile user interface is touched by the fingertip. In this case, since the fingertip 401 is lower than the detection threshold 402, the tactile user interface detects the user input.

FIG. 4C illustrates the condition where the convex shape is touched by the fingertip. In this case, although the fingertip 401 touches the transparent sheet 301, the fingertip 401 is higher than the detection threshold 402. For this reason, no user input is detected. FIG. 4D illustrates the condition where the fingertip 401 presses the convex shape. In this case, since the fingertip 401 is lower than the detection threshold 402, the tactile user interface detects the user input. In other words, in the area where the convex shape is formed, it is possible for the user to obtain the same operation feel as the user obtains from the conventional button, since the user input is detected only after the user presses the convex shape.

Next, using a flowchart in FIG. 5, descriptions will be hereinbelow provided for how the operation determiner 102 performs an operation determination process on the user input.

In step S501, it is determined whether or not the height of the fingertip 401 is lower than the detection threshold 402. If lower (or if the user input is being detected), the process proceeds to step S502. If higher (or if there is no user input), the process proceeds to step S511.

In step S502, it is determined whether the user input position remains constant while the operation is ongoing. If constant, the process proceeds to S503. If not constant (or if the user input position is moving or sliding), the process proceeds to step S508.

In step S503, it is determined whether or not the user input position coincides with the convex position. If the user input position coincides with the convex position, the process proceeds to step S504. If the user input position does not coincide with the convex position, the process proceeds to step S505.

In step S504, it is determined that the user input is made by a press operation. Then, the process is terminated.

In step S505, it is determined whether or not the user input has continued longer than a threshold time. If the user input has not continued longer than the threshold time, the process proceeds to step S506. If the user input has continued longer than the threshold time, the process proceeds to step S507.

In step S506, it is determined that the user input is made by a touch operation. Then, the process is terminated.

In step S507, it is determined that the user input is made by a long press operation. Then, the process is terminated.

In step S508, it is determined whether the previous user input is made by a long press operation or a slide operation 2. If the previous user input is made by either the long press operation or the slide operation 2, the process proceeds to step S510. If the previous user input is made by neither the long press operation nor the slide operation 2, the process proceeds to step S509.

In step S509, it is determined that the user input is made by a slide operation 1. Then, the process is terminated.

In step S510, it is determined that the user input is made by the slide operation 2. Then, the process is terminated.

In step S511, it can be determined that there is no user input, since it is the case where the height of the finger is outside the detection threshold range. Accordingly, the process is terminated.

The above-described process procedure enables the user input operation to be determined optimally.

Here, using FIGS. 6 to 8D, descriptions will be provided for how an image is deleted by the slide operation 2 which is one function included in the image managing function.

FIG. 6 is a flowchart illustrating how the tactile user interface works to delete an image in response to the slide operation 2.

In step S601, it is determined whether or not the user operation is the slide operation 2. If the user operation is the slide operation 2, the process proceeds to step S602. If the user operation is not the slide operation 2, the process proceeds to step S606.

In step S602, it is determined whether or not the user input position is on the delete button. If the user input position is on the delete button, the process proceeds to step S603. If the user input position is not on the delete button, the process proceeds to step S605.

In step S603, it is determined whether or not an image selected by the slide operation 2 is under protection. If the image is under protection, the process proceeds to step S604. If the image is not under protection, the process proceeds to step S605.

In step S604, control is made such that the shape of the delete button becomes convex. Then, the process is terminated. Thereby, the user can intuitively recognize by the tactile sense that the slide operation 2 to the delete button is invalid.

In step S605, control is made such that the shape of the delete button becomes flat. Then, the process is terminated. Thereby, the user can make the slide operation to the delete button without feeling discomfort and without perceiving the deformable part by touch.

In step S606, it is determined whether or not an image selected by the touch operation is under protection. If the image is under protection, the process proceeds to step S607. If the image is not under protection, the process proceeds to step S608.

In step S607, control is made such that the shape of the delete button becomes flat. Then, the process is terminated. Thereby, the user can recognize that the press operation to the delete button is invalid.

In step S608, control is made such that the shape of the delete button becomes convex. Then, the process is terminated. Thereby, the user can intuitively recognize by the tactile sense that the delete button is usable as a press button. Meanwhile, the tactile user interface receives the input once the button is depressed by the press operation. For these reasons, the user can obtain the same operational feel as the user obtains from the conventional button.

Next, FIGS. 7A, 7B, 7C and 7D each are a diagram illustrating how the tactile user interface works to delete an image in response to the slide operation 2 in a case where the image is not protected. Incidentally, components which are the same as those in FIG. 2A will be denoted by the same reference numerals. Descriptions for such components will be omitted.

A fingertip 701 is at the position of a thumb nail image 8, from which the slide operation 2 starts. A fingertip 702 is at the position of the delete button 202, at which the slide operation 2 ends.

Figure 7A:
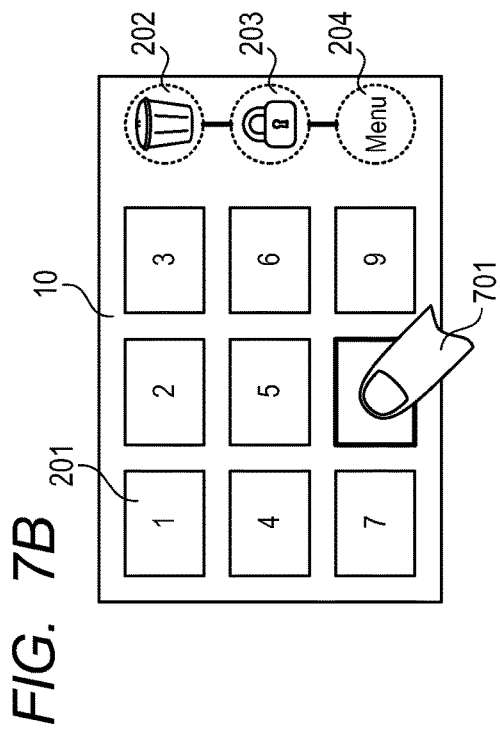
FIG. 7A is a diagram illustrating how the tactile user interface works in response to the user's operation in the first embodiment.

FIG. 7A illustrates a condition before the slide operation 2 is performed. Images 1 to 9 are displayed as thumb nails.

Since the selected image 8 is not protected, each button, including the delete button 202, is in the convex shape (in step S608).

Figure 7B:
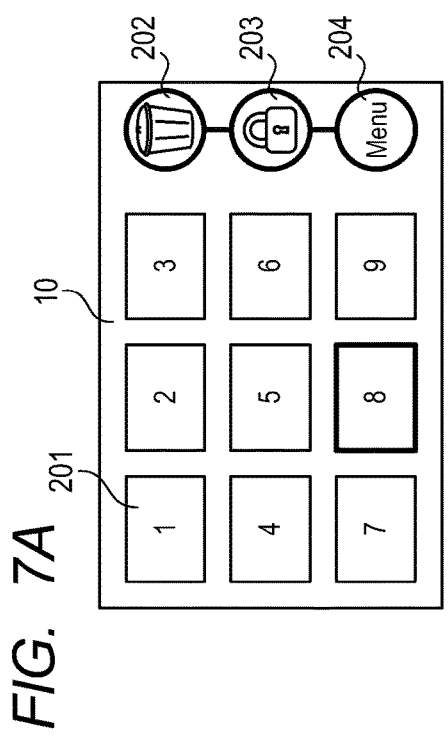
FIG. 7B is a diagram illustrating how the tactile user interface works in response to the user's operation in the first embodiment.

FIG. 7B is a diagram illustrating what happens once the slide operation 2 starts to be performed on the thumb nail image 8. To put it specifically, if the touch operation on the selected thumb nail image 8 continues longer than the threshold time (in step S505), it is determined that the long press operation is made (in step S507), and the frame of the selected thumb nail 8 is emphatically displayed. Thereafter, once the detection position changes (in step S502), it is determined that the slide operation 2 starts (in step S510), and each button, including the delete button 202, changes into the flat shape (in step S605).

Figure 7C:
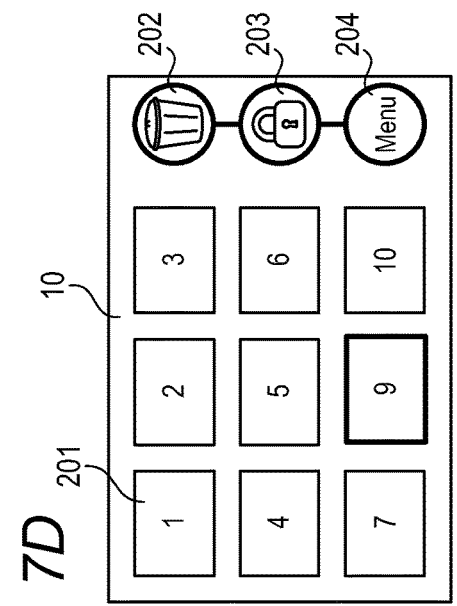
FIG. 7C is a diagram illustrating how the tactile user interface works in response to the user's operation in the first embodiment.

FIG. 7C is a diagram illustrating a state during the slide operation 2. To put it specifically, the thumb nail image 8 selected when the slide operation 2 starts continues being displayed following the movement of the finger from the fingertip 701 to the fingertip 702. During the slide operation 2, each button, including the delete button 202, remains flat since the thumb nail image 8 is not protected (in step S605).

Figure 7D:
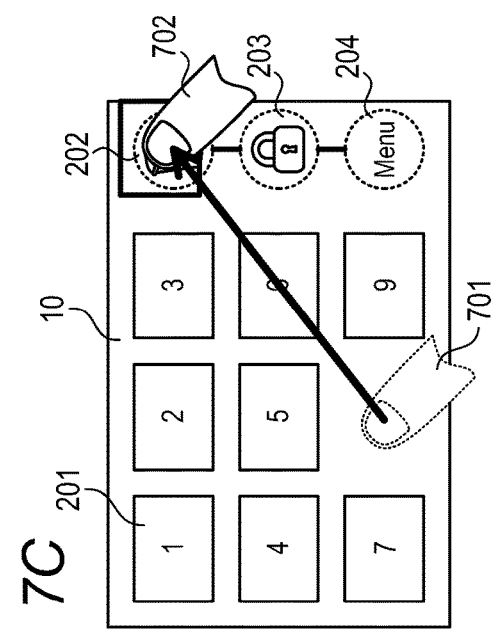
FIG. 7D is a diagram illustrating how the tactile user interface works in response to the user's operation in the first embodiment.

FIG. 7D is a diagram illustrating what happens when the slide operation 2 ends with the finger detached from the delete button 202 after the condition illustrated in FIG. 7C. The image 8 is deleted, and no longer displayed as the thumb nail. Furthermore, the selected image is replaced with the image 9 which is formed following the image 8 just having been deleted. In a case where the image 9 is not protected, each button, including the delete button 202, changes into the convex shape (in step S608). Incidentally, the digital camera 1 may be configured to ask the user whether or not to delete the image 8 before the deletion.

As described above, any unprotected image can be deleted without difficulties by the slide operation 2.

Next, FIGS. 8A, 8B, 8C and 8D each are diagrams illustrating how the tactile user interface works to delete an image in response to the slide operation 2 in a case where the image is protected. Incidentally, because the components are the same as those in FIGS. 7A, 7B, 7C and 7D, the components will be denoted by the same reference numerals. Descriptions for such components will be omitted.

Figure 8A:
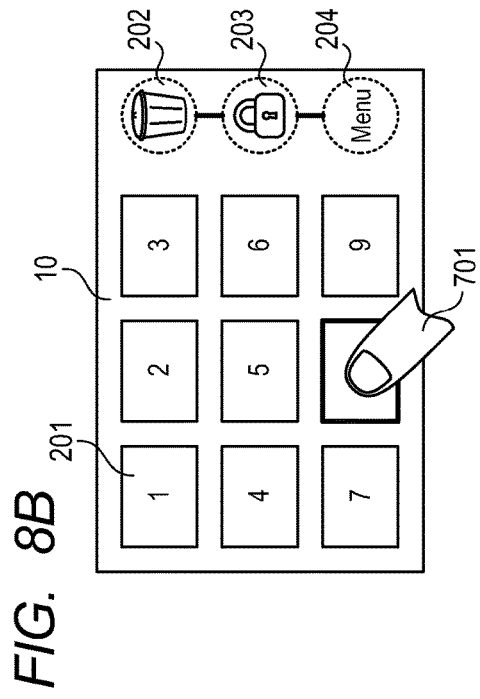
FIG. 8A is a diagram illustrating how the tactile user interface works in response to the user's operation in the first embodiment.

FIG. 8A illustrates a condition before the slide operation 2 is performed. Images 1 to 9 are displayed as thumb nails. Since the selected image 8 is protected, each button, including the delete button 202, is in the flat shape (in step S607).

Figure 8B:
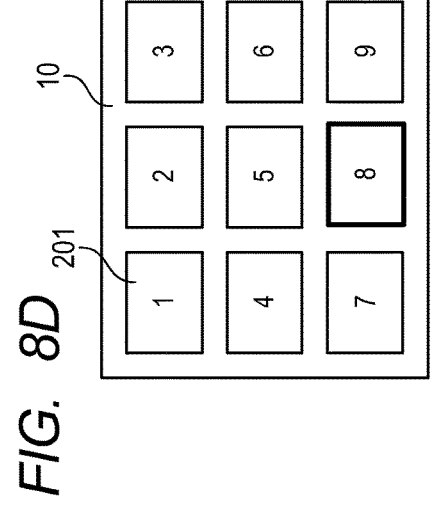
FIG. 8B is a diagram illustrating how the tactile user interface works in response to the user's operation in the first embodiment.

FIG. 8B is a diagram illustrating what happens once the slide operation 2 starts to be performed on the thumb nail image 8. Descriptions for FIG. 8B will be omitted because FIG. 8B is the same as the FIG. 7B.

Figure 8C:
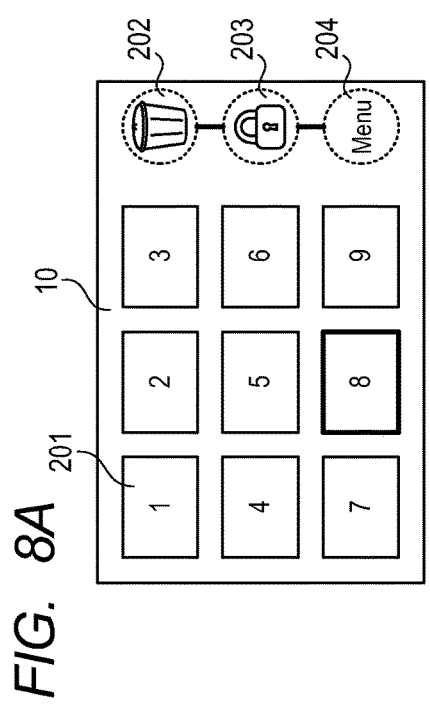
FIG. 8C is a diagram illustrating how the tactile user interface works in response to the user's operation in the first embodiment.

FIG. 8C is a diagram illustrating what is going on during the slide operation 2. To put it specifically, the thumb nail image 8 selected when the slide operation 2 starts continues being displayed following the movement of the finger from the fingertip 701 to the fingertip 702. During the slide operation 2, each button, including the delete button 202, changes into the convex shape when the finger reaches the position represented by the fingertip 702, since the thumb nail image 8 is protected (in step S604).

Figure 8D:
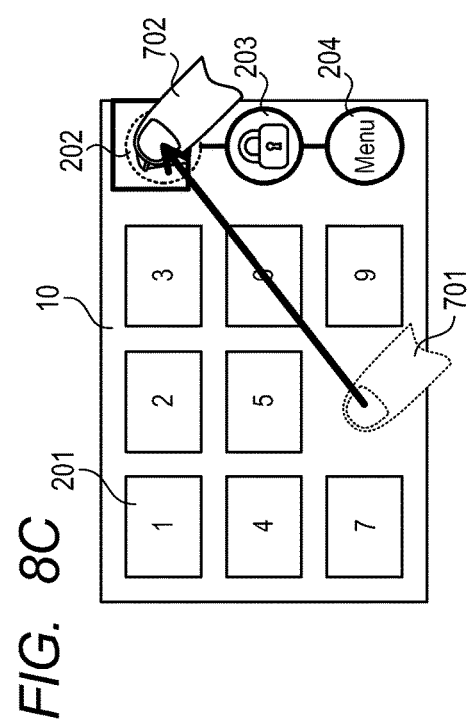
FIG. 8D is a diagram illustrating how the tactile user interface works in response to the user's operation in the first embodiment.

FIG. 8D is a diagram illustrating what happens when the slide operation 2 ends with the finger detached from the delete button 202 after the condition illustrated in FIG. 8C. Since the image 8 is protected, the image 8 is not deleted. That is to say, the image 8 returns to the condition from which the slide operation 2 starts, and which is the same as that illustrated in FIG. 8A. Furthermore, each button, including the delete button 202, changes into the flat shape (in step S608).

As described above, when the slide operation 2 requests the protected image to be deleted, the delete button 202 is changed into the convex shape, as illustrated in FIG. 8C. Thereby, the user can intuitionally recognize by the tactile sense that the delete operation is invalid.

It should be noted that although the delete button 202 is changed into the convex shape in step S604, the change pattern is not limited to this one. For example, the delete button 202 may be changed into a periodical (alternate) series of convex and flat shapes.

In addition, in FIG. 8B, when the slide operation 2 starts to be performed on the thumb nail image 8, the thumb nail image 8 being operated is protected, and thus the delete button 202 which represents the invalidated operation (process) on the thumb nail image 8 may be changed into the convex shape. In other words, when the detector detects an operation (a drag operation of a protected thumb nail image), may change the shape of the delete button 202 whose effect is to be nullified by the detected operation (the deformable part in the position corresponding to the invalidated process) to notify the user to that effect. Otherwise, the controller may determine which thumb nail image is being dragged, and then change into the concave shape the tactile user interface (such as the delete button) in the position representing a process (operation) to be invalidated on the dragged thumb nail image.

In the case where the deletion responding to the slide operation 2 is nullified as described above, the use of the tactile guidance enables the user to intuitionally recognize it.

It should be noted that although the embodiment has described for the configuration in which the three buttons corresponding to the respective deformable parts share the only one pump, the same effects can be obtained from a configuration in which the buttons are provided with their respective pumps and are thereby capable of changing their respective shapes independently. In this case, the determination shown in step S602 may be skipped. Then, if the image selected by the slide operation 2 is protected, only the delete button may be changed in the convex shape.

Furthermore, although the embodiment has described the user interface apparatus in which the display is flat, the display is not limited to being flat. The same effects can be obtained from a user interface apparatus whose surface is curved and which includes the deformable parts formed under the curved surface.

Moreover, although the configuration for changing the shape of the tactile user interface has been described using the example where the fluid flows into each cavity, the configuration is not limited to this example. Any configuration may be used, as long as it is capable of giving the tactile guidance to the user by changing the shape of the surface of the tactile user interface. What is more, although the change in the shape has been described citing the convex shape, the change is not limited to this example. The same effects can be obtained from a concave shape, a combination of convex and concave shapes, and a configuration in which a coefficient of friction on the surface is changed by use of electric characteristics.

In addition, although the embodiment has described the configuration for detecting the user input by citing the example where the touch operation, the long press operation, the slide operation 1, the slide operation 2 and the press operation are identified using the capacitance type touch sensor alone, the configuration is not limited to this example. The configuration may be such as, in addition to the capacitance type touch sensor, the configuration includes a piezoelectric sensor formed in each cavity to detect the user's press operation by sensing a change in the pressure inside the cavity which occurs when the user presses the convex shape.

Second Embodiment

Referring to FIGS. 9 to 13D, descriptions will be hereinbelow provided for an operation apparatus (user interface apparatus) of a second embodiment of the present invention. In this embodiment, the user interface apparatus will be described using an example of a user interface for an image displaying function of a digital camera 2 which is an image pickup apparatus including an image pickup element for receiving an object light from an image pickup optical system.

Figure 9:
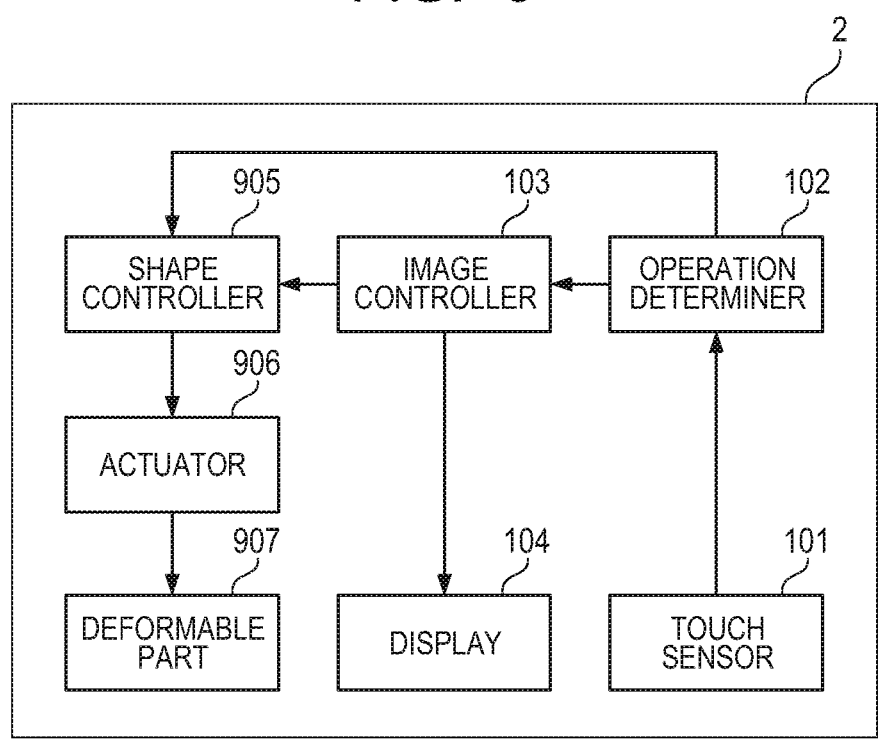
FIG. 9 is a configuration diagram illustrating an operation apparatus of a second embodiment.

FIG. 9 illustrates a configuration of the user interface apparatus of the second embodiment of the present invention. It should be noted that: components which are the same as those in FIG. 1 will be denoted by the same reference numerals; and descriptions for such components will be omitted.

A shape controller 905 operates based on determinations which are different from those made in the first embodiment. For this reason, the shape controller is denoted by the reference numeral which is different from that used in the first embodiment.

Actuators 906 and deformable parts 907 are different from the actuator 106 and the deformable part 107 of the first embodiment. For this reason, the actuators and the deformable parts are denoted by the reference numerals which are different from those used in the first embodiment. Detailed descriptions will be provided for these components later.

Figures 10A, 10B:
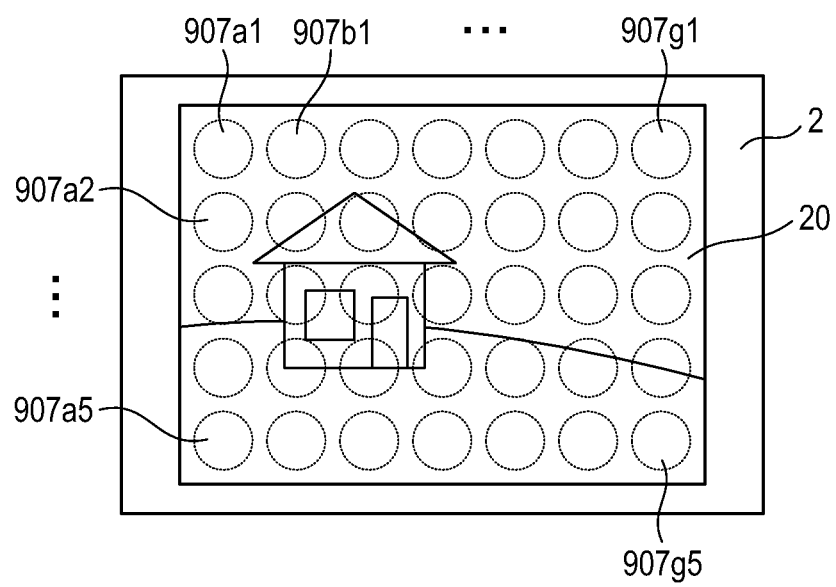
FIG. 10A is a diagram illustrating an external configuration of the operation apparatus of the second embodiment.
FIG. 10B is a diagram illustrating the external configuration of the operation apparatus of the second embodiment.

Next, using FIGS. 10A and 10B, descriptions will be provided for an external configuration of the digital camera 2, and for how the digital camera 2 works during the image displaying function.

As shown in FIG. 10A, the digital camera 2 includes the touch sensor 101 and the display 104 which are overlaid on a display screen 20. The digital camera 2 includes the deformable parts 907 which are arranged spread over almost all the surface of the display screen 20. To put it specifically, the digital camera 2 has the deformable parts 907 at a total of 35 positions with 5 positions in each column and 7 positions in each row. The deformable parts in the uppermost row are denoted by reference numerals 907$a$1, 907$b$1, ..., 907$g$1 in order from the left to the right. The deformable parts in the leftmost column are denoted by reference numerals 907$a$1, 907$a$2, ..., 907$a$5 in order from the top to the bottom. Thus, the deformable part at the right bottom is denoted by reference numeral 907$g$5. The digital camera 2 further includes pumps, or the actuators 906, which are provided to the respective deformable parts 907. The shape controller 905 is capable of controlling the shapes of the deformable parts independently by use of the respective actuators (pumps) 906.

In sum, the second embodiment is different from the first embodiment in that: the deformable parts 907 are arranged spread over almost all the surface of the display screen 20; and the shape controller 905 is capable of controlling the shapes of the deformable parts independently.

As described above, the display screen 20 is a display (hereinafter referred to as a tactile user interface as well) which usually has a flat surface, and which is capable of changing a specific area in its flat surface into a convex shape for the purpose of giving a tactile guidance to the user. While the image displaying function of the embodiment is being performed, the tactile user interface deforms the surface of each button (a specific area including multiple regions) into the convex shape.

While performing the image displaying function, the digital camera 2 displays an image across the display screen 20 as illustrated in FIG. 10A. In response to the slide operation 1 in the left-right direction, the digital camera 2 switches the currently-displayed image to the next or previous image.

Meanwhile, FIG. 10B illustrates a configuration for storing images taken by the digital camera 2. The digital camera 2 stores the taken images in groups. Each time the user takes an image, the digital camera 2 allows the user to decide a group into which to store the image using the menu for the image pickup function. While the digital camera 2 is performing the image displaying function, each time the user requests the next image by the slide operation 1, the digital camera 2 displays the image in such a sequential manner that Photo0101 is followed by Photo0102, which is followed by Photo0201, beyond their groupings.

It should be noted that during the image displaying function, the deformable parts 907 are usually flat. This is because the changes in the shapes of the deformable parts 907 decrease the visibility of the image. Meanwhile, during a function other than the image displaying function, the digital camera 2 uses convex shapes as buttons. For example, during the image managing function illustrated in the first embodiment, the digital camera 2 forms convex shapes in response to each button.

The detailed structure of the actuators 906 and the detailed structure of the deformable parts 907 are the same as those illustrated in FIGS. 3A and 3B for the first embodiment. For this reason, descriptions for their structures will be omitted.

Furthermore, how the touch sensor 101 detects the user input is the same as that illustrated in FIGS. 4A, 4B, 4C and 4D for the first embodiment. For this reason, descriptions for it will be omitted.

Figure 5:
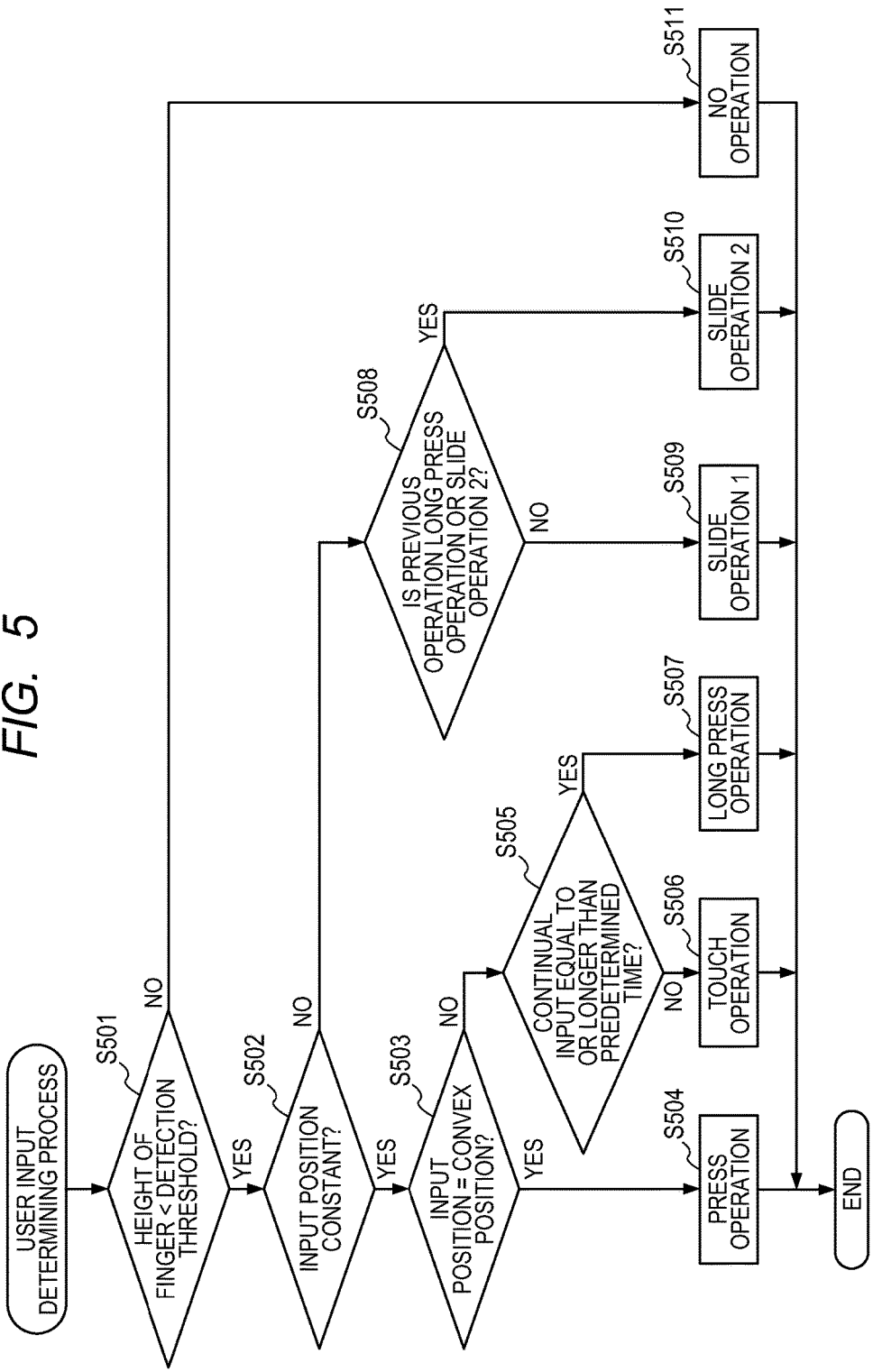
FIG. 5 is a flowchart illustrating a flow of an input detection process of the first embodiment.

Moreover, how the operation determiner 102 performs the operation determination process on the user input is the same as that illustrated in FIG. 5 for the first embodiment. For this reason, descriptions for it will be omitted.

Next, using FIGS. 11, 12A, 12B and 12C, descriptions will be provided for how images are changed during the image displaying function.

FIG. 11 is a flowchart illustrating how the tactile user interface works to changes images in response to the slide operation 1.

In step S1101, it is determined whether or not the user operation is the slide operation 1. If the user operation is the slide operation 1, the process proceeds to step S1102. If the user operation is not the slide operation 1, the process proceeds to step S1104.

In step S1102, it is determined whether or not the groups of the images before and after the change of image are the same. If the groups are not the same, the process proceeds to step S1103. If the groups are the same, the process proceeds to step S1104.

In step S1103, all the deformable parts are set into the convex shape. Then, the process is terminated.

In step S1104, all the deformable parts are set into the flat shape. Then, the process is terminated.

According to the above-discussed flowchart, after in response to the slide operation 1, the images are changed beyond their groupings, the deformable parts 907 arranged across almost all the surface of the display screen 20 are changed into the convex shape (in step S1103). Furthermore, after the slide operation 1 ends, all the deformable parts are set into the flat shape (in step S1104). This makes it possible to prevent the visibility of the image from decreasing.

Figure 12A:
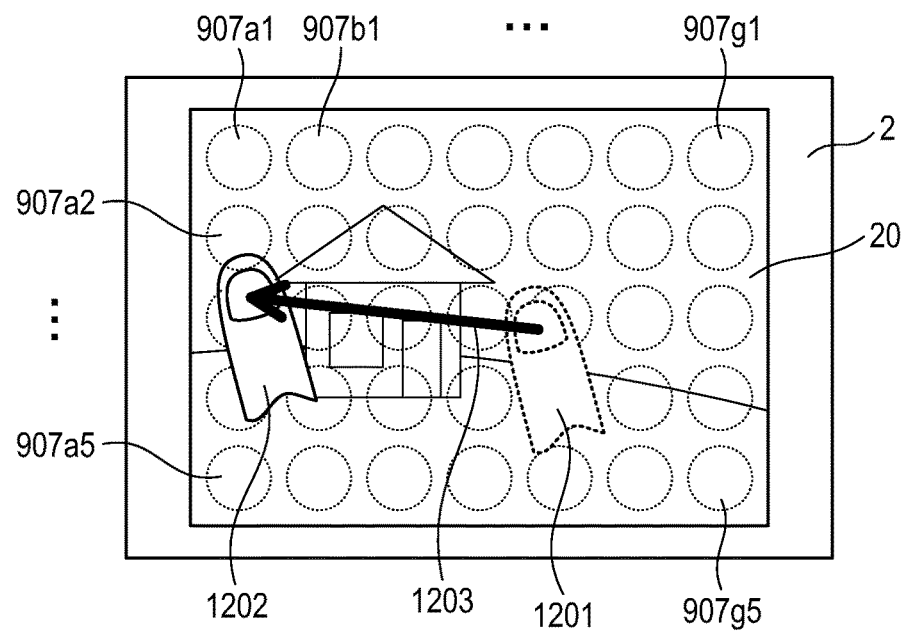
FIG. 12A is a diagram illustrating how the tactile user interface works in response to the user's operation in the second embodiment.
Figure 12B:
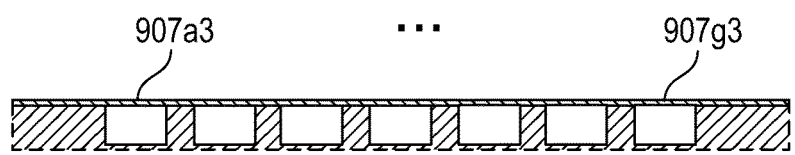
FIG. 12B is a diagram illustrating how the tactile user interface works in response to the user's operation in the second embodiment.
Figure 12C:
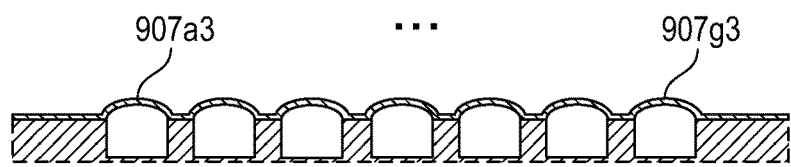
FIG. 12C is a diagram illustrating how the tactile user interface works in response to the user's operation in the second embodiment.

FIGS. 12A, 12B and 12C illustrate the slide operation 1 by the user for requesting images to be changed. Incidentally, components which are the same as those illustrated in FIG. 10B are denoted by the same reference numerals, and descriptions for such components will be omitted. FIG. 12A is a diagram illustrating the slide operation 1 from above.

A fingertip 1201 indicates a position from which the slide operation 1 starts. A fingertip 1202 indicates a position where the slide operation 1 ends. A trace 1203 is a trace of the movement of the fingertip during the slide operation 1. The fingertip 1202 is placed on the left side of the fingertip 1201. Since the direction of the slide operation 1 is a leftward direction, the operation determiner determines that the slide operation 1 is an operation for requesting to show the next image.

Once the slide operation 1 towards the left illustrated in FIG. 12A is made while Photo0101 is being displayed by being selected from the stored image configuration illustrated in FIG. 10B, Photo0102 is displayed. In this case, since the group including Photo0101 and the group including Photo0102 are the same (S1102), the deformable parts remain in the flat shape (in step S1104), as illustrated by the cross-section diagram of FIG. 12B.

Thereafter, once the slide operation 1 towards the left illustrated in FIGS. 12A, 12B and 12C is made, Photo0201 is displayed. In this case, since the group including Photo0102 is different from the group including Photo0201 (S1102), the deformable parts change into the convex shape and remain in the convex shape during the slide operation 1 (in step S1103), as illustrated by the cross-section diagram of FIG. 12C.

In sum, the deformable parts 907a3 to 907e3 located on the trace 1203 also change into the convex shape. Thereby, the user can feels the concave and convex shapes alternately during the slide operation 1. Through this tactile guidance, the user can intuitively recognize that the group including the newly-displayed image differs from the group including the previous-displayed image.

It should be noted that although in this embodiment, the informing of the user that the group including the newly-displayed image differs from the group including the previous-displayed image is achieved by changing all the deformable parts into the convex shape, how to inform the user is not limited to this example. The informing of the user may be achieved by: estimating a possible trace of the movement of the fingertip based on the speed and direction of the slide operation 1; and changing into the convex shape only deformable parts corresponding to the estimated trace. To put it specifically, when the slide operation 1 towards the left from the fingertip 1201 is detected, only the deformable parts 907a3 to 907e3 over which the fingertip is estimated to pass may be changed into the convex shape, as illustrated in FIG. 13A, with their surroundings set into the flat shape. Otherwise, because it is difficult to estimate the trace accurately, only deformable parts located within an area which is enclosed by upper and lower lines forming a certain angle at the position of the fingertip 1201 with the direction of the slide operation 1 may be changed into the convex shape, as illustrated in FIG. 13B, with their surroundings set into the flat shape. Instead, only deformable parts within a distance which the fingertip is estimated to reach from its current position in a time T based on the direction and speed of the slide operation 1 may be changed in the convex shape, as illustrated in FIG. 13C, with their surroundings set into the flat shape. This time T is calculated from the amount of time it takes to change the deformable parts in the convex shape from the flat shape. Furthermore, the deformable parts do not always have to be changed into the concave and convex shapes during the slide operation 1 to inform the user. Only one deformable part may be changed into the convex shape to inform the user as illustrated in FIG. 13D.

Moreover, in the embodiment, at a timing when a folder storing a newly-selected image differs from the previous folder, the user is informed of it by the changed shapes of the deformable parts. However, timings for informing the user are not limited to this case. For example, the user may be informed at the following timings: a timing when the photographed date, GPS positional information, information on a used lens, or the like recorded in a newly-selected photograph differs from that recorded in the previous photograph; a timing when an operation for switching to the next image occurs at the last image; at a timing when the size or format of an image is changed.

In addition, the user may be informed each time the next image is a moving image. To view a moving image, the user needs to replay it. In a case where still images and moving images are stored mixedly, it has to be determined whether or not an image to be displayed next is a moving image. For this reason, when the image to be displayed next is a moving image, the user is informed of it by the tactile guidance. Thereby, the user can instantaneously recognize the image to be displayed next is a moving image. Moreover, in the case where the image to be displayed next is a moving image, a convex shape formed on a deformable part to inform the user can be used as a press button for inviting the user to replay the moving image without returning the deformable part to the flat shape after informing the user.

Furthermore, in a case where the user is intended to be informed using multiple factors, a combination pattern of the concave and convex shape may be changed. For example, when one group is changed to another, the user may be informed of it by the convex shape formed on only one deformable part, as shown in FIG. 13D; and when no next image is found after the last image, the user may be informed of it by the convex shapes formed on the entire surface of the display screen.

What is more, in a case where a photograph can be enlarged or reduced in size by the slide operation at multiple positions, for example when the photograph currently displayed in a maximum size is requested to be displayed in a much larger size, the user may be informed by changing the shape.

It should be noted that although the embodiment has been described citing the image displaying function of the digital camera, the embodiment is not limited to this example. The same effects can be obtained from various functions of various products.

For example, the same effects can be obtained from a personal digital assistant while performing a document data displaying function. In this case, for example, the user may be informed at the following timings: at a timing when the top or end of a text is arrived at; at a timing when the next text starts; at a timing when the text goes into another section; and at a timing when a moving image or an animation is embedded in a text.

In addition, although the embodiment has been described in which the display is flat, the embodiment is not limited to this case. The same effects can be obtained from a user interface apparatus whose surface is curved and which includes deformable parts formed under the curved surface.

Furthermore, although the configuration for changing the shape of the tactile user interface has been described using the example where the fluid flows into each cavity, the configuration is not limited to this example. Any configuration may be used, as long as it is capable of giving the tactile guidance to the user by changing the shape of the surface of the tactile user interface. What is more, although the change in the shape has been described citing the concave shape, the change is not limited to this example. The same effects can be obtained from a concave shape, a combination of convex and concave shapes, and a configuration in which a coefficient of friction on the surface is changed by use of electric characteristics.

As described above, the shape controller (controller) informs the user by changing the shapes of the deformable parts according to the response (the change in the image information, or the like) from the instruction destination to the instruction given to the apparatus by the operation of the touch sensor (the move to the next image by the slide operation, or the like).

Moreover, although in the embodiment, the configuration for detecting the user input has been described using the example where the touch operation, the slide operation and the press operation are identified using only the capacitance type touch sensor, the configuration is not limited to this example. The configuration may be such as, in addition to the capacitance type touch sensor, the configuration includes a piezoelectric sensor formed in each cavity to detect the user's press operation by sensing a change in the pressure inside the cavity which occurs when the user presses the convex shape.

Third Embodiment

Referring to FIGS. 14 to 16B, descriptions will be hereinbelow provided for an operation apparatus (user interface apparatus) of a third embodiment of the present invention. In this embodiment, the user interface apparatus will be described using an example of a digital camera remote control function of a personal digital assistant (PDA) 3.

Figure 14:
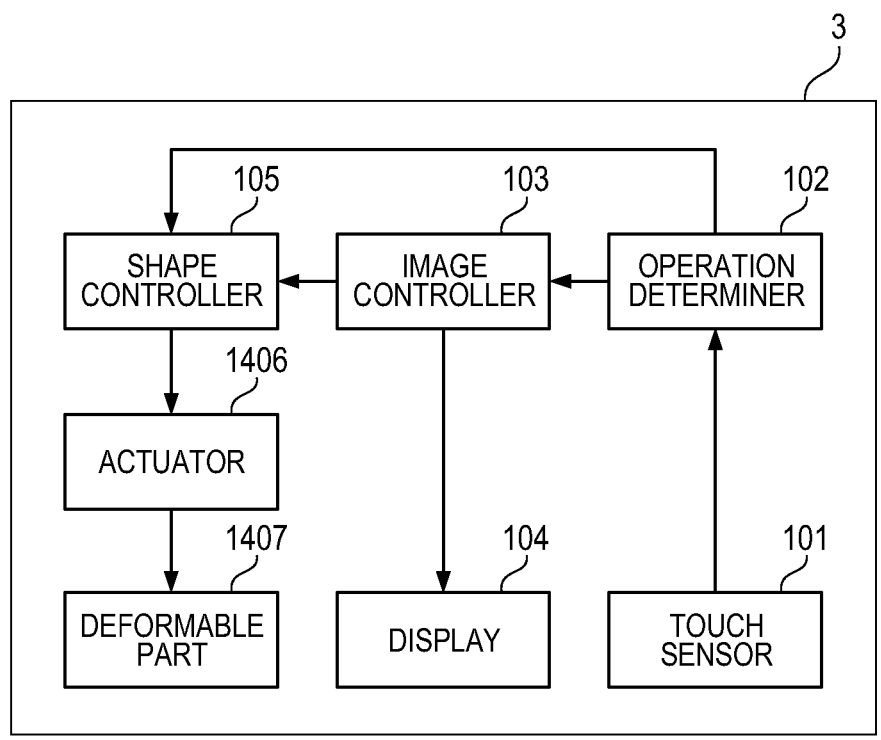
FIG. 14 is a configuration diagram illustrating an operation apparatus of a third embodiment.

FIG. 14 illustrates a configuration of the user interface apparatus of the third embodiment of the present invention. It should be noted that: components which are the same as those in FIG. 1 will be denoted by the same reference numerals; and descriptions for such components will be omitted.

An actuator 1406 and a deformable part 1407 are different in structure from the actuators and the deformable parts of the other embodiments, and are accordingly denoted by reference numerals different from those given to their counterparts. Detailed descriptions will be provided for the actuator 1406 and the deformable part 1407 later.

It should be noted that the user interface apparatus may be connected to the digital camera, albeit not illustrated, wirelessly or by a cable.

Figure 15B:
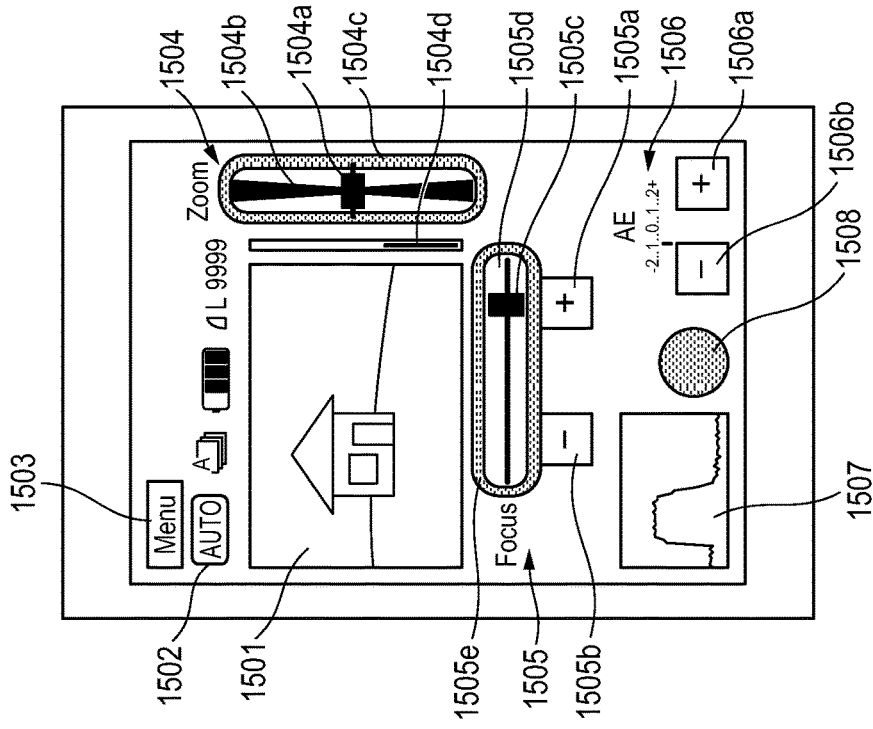
FIG. 15B is a diagram illustrating the external configuration of the operation apparatus of the third embodiment.
Figure 15A:
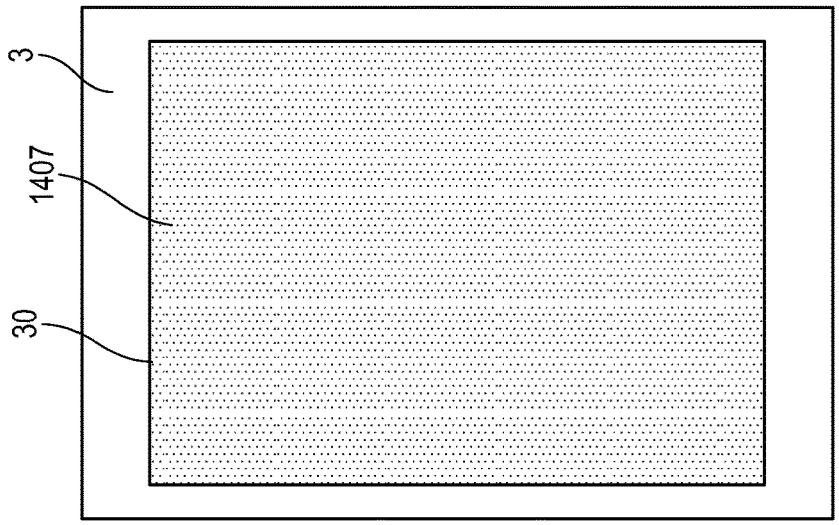
FIG. 15A is a diagram illustrating an external configuration of the operation apparatus of the third embodiment.

Next, an external configuration of the personal digital assistant 3 and an example of the digital camera remote control function will be shown using FIGS. 15A and 15B.

As illustrated in FIG. 15A, the personal digital assistant 3 includes the touch sensor 101 and the display 104 which are overlaid on a display screen 30 of the personal digital assistant 3. The personal digital assistant 3 includes the deformable part 1407 which is arranged spread over all the surface of the display screen 30. The deformable part 1407 is capable of changing the shape of the display screen 30 at an arbitrarily-selected position to form a convex portion there. This will be described in detail later.

FIG. 15B illustrates the example of the digital camera remote control function of the personal digital assistant 3.

A camera image displaying area 1501 is an area in which to display a video which is being captured by the digital camera connected to the personal digital assistant 3. Furthermore, the personal digital assistant 3 is capable of setting a focus area when the user touches an arbitrary place in the camera image displaying area 1501, and capable of performing an autofocus operation for focusing the place.

A camera information displaying area 1502 is an area in which to display information set for the camera. The camera information displaying area 1502 displays a photographing mode, the remaining battery level of the digital camera, the number of remaining shots, and the like.

A menu button 1503 is a button for displaying a menu of various setting changes for the digital camera and the digital camera remote control function of the personal digital assistant 3.

A zoom operation area 1504 is an area for remotely controlling the zoom operation of the digital camera from the personal digital assistant 3. The user can control the zoom by: selecting a slider 1504a by a touch operation; and thereafter sliding the slider 1504a along a slide bar 1504b upward and downward. An operation guide portion 1504c is a guide portion which normally stays flat, and which, when the user selects the slider 1504a, changes into a convex shape in order to help the user easily operate the slider 1504a along the slide bar 1504b. In addition, a display bar 1504d is a display portion in which to display a zoom position relative to the whole zoom field. The zoom operation will be described in detail later.

A focus operation area 1505 is an area for remotely controlling the focus operation of the digital camera from the personal digital assistant 3. The user can remotely control the focus operation of the digital camera using a + button 1505a, a − button 1505b and a slider 1505c of the focus operation area 1505. The + button 1505a and the − button 1505b are operable by the touch operation, and continuously operable by the long press operation. In addition, the slider 1505c and a slide bar 1505d indicate that the focus position relative to the whole focus field becomes closer to infinity as the slider 1505c becomes closer to the right end of the slide bar 1505d, and that the focus position relative thereto becomes closer to an object as the slider 1505c becomes closer to the left end of the slide bar 1505d. The user can control the focus by: selecting the slider 1505c by a touch operation; and thereafter sliding the slider 1505c along the slide bar 1505d leftward and rightward. In addition, an operation guide portion 1505e is configured in the same manner as is the operation guide portion 1504c for the zoom operation. For this reason, descriptions for the operation guide portion 1505e will be omitted. The focus operation will be described in detail later.

An auto-exposure setting area 1506 is an area for remotely controlling the setting of the auto-exposure of the digital camera from the personal digital assistant 3. The user can set the auto-exposure of the digital camera using a + button 1506a and a − button 1506b of the auto-exposure setting area 1506.

An image evaluation value displaying area 1507 is an area in which to display image evaluation values. Examples of the image evaluation values include a contrast evaluation value, and a vector scope evaluation value. In addition, the image evaluation value displaying area 1507 may display a magnified image of a set focus area as well.

A release button 1508 is a button for releasing the remotely-controlled digital camera. The release button 1508 has a convex shape. When pressed, the release button 1508 releases the remotely-controlled digital camera.

In the digital camera remote control function, the release button 1508 is normally in the convex shape while the other buttons and areas are staying flat.

Figure 16A:
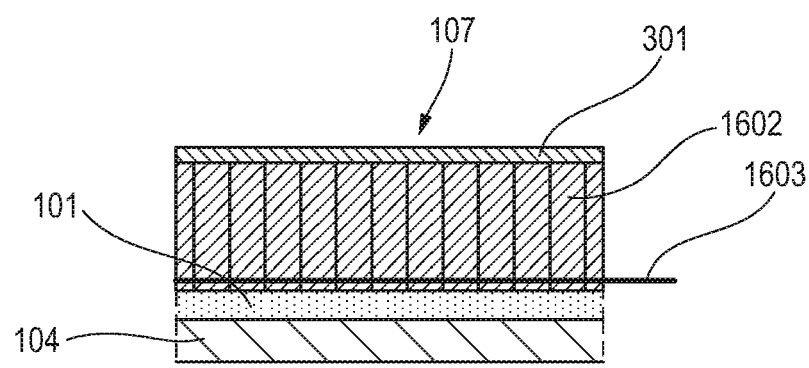
FIG. 16A is a cross-sectional configuration diagram of a tactile user interface for each button in the third embodiment.
Figure 16B:
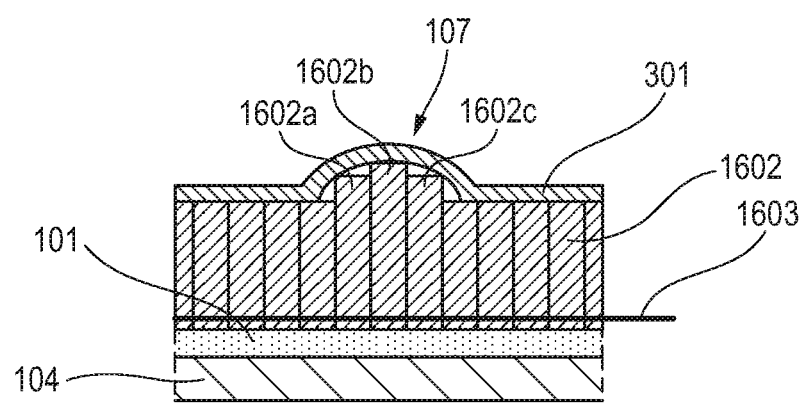
FIG. 16B is a cross-sectional configuration diagram of the tactile user interface for each button in the third embodiment.

Next, using FIGS. 16A and 16B, detailed descriptions will be provided for the actuator 1406 and the deformable part 1407.

FIGS. 16A and 16B are cross-sectional diagrams illustrating a configuration of the tactile user interface of each button. FIG. 16A is a diagram illustrating the tactile user interface as staying flat. FIG. 16B is a diagram illustrating the tactile user interface as deformed into the convex shape in order to give the tactile guidance to the user. Incidentally, components having the same contents as are described in FIGS. 3A and 3B are denoted by the same reference numerals. Descriptions for such components will be omitted.

The tactile user interface includes the transparent sheet 301, expansible materials 1602, an electrode 1603, the touch sensor 101, and the display 104. Reference numeral 1602 denotes the transparent expansible materials which expand in response to electric signals, and which serves as a combination of the actuators 906 and the deformable parts 907. Reference numeral 1603 denotes the electrode for sending electric signals to the expansible materials 1602. It is desirable that the electrode 1603 be transparent.

In FIG. 16A, the electrode 1603 is outputting an electric signal for contracting the expansible materials 1602, and the display screen is accordingly flat. Meanwhile, in FIG. 16B, the electrode 1603 is outputting an electric signal for expanding expansible materials 1602a, 1602b, 1602c included in the expansible materials 1602, and the convex portion is accordingly generated on the display.

Furthermore, in the personal digital assistant 3, the expansible materials 1602 are two-dimensionally arranged on the display screen, and the shape controller 105 is accordingly capable of controlling the expansion of each expansible material 1602 using the electrode 1603.

The foregoing configuration makes it possible for the tactile user interface to form the convex shape in an arbitrarily-selected shape and size, and at an arbitrarily-selected place on the display screen 30. In addition, it is desirable that each expansible material 1602 be small in size. When each expansible material 1602 is as small as or smaller than the pixel size, the convex portion can be generated coinciding with an image on the screen. A combination use of the thus-generated convex portion and an input graphic displayed by the display screen 30 makes the convex portion function as a button which the user can press, and which informs the user of an input position on the touch sensor 101.

It should be noted that: how the touch sensor 101 detects the user input is the same as is illustrated in FIGS. 4A, 4B, 4C and 4D in the first embodiment; and how the operation determiner 102 performs the operation determination process on the user input is the same as is illustrated in FIG. 5 in the first embodiment. For this reason, description for them will be omitted.

Next, descriptions will be provided for how the user interface for the digital camera remote control function of the personal digital assistant 3 works when the + button 1505a of the focusing is pressed.

The + button 1505a of the focusing normally stays flat. Depending on how long the user continues operating the + button 1505a by the long press, the user can update an instruction on the focus position toward infinity, and thereby can control the focus of the remotely-controlled digital camera toward infinity. In addition, the slider 1505c indicates the position of the driven focus relative to the whole focus field.

In the case, if the user still continues operating the + button 1505a by the long press even after driving the focus to the infinity end, the + button 1505a is deformed into the convex shape. Thereby, the user interface can inform the user that the focus can no longer be driven in response to the user's operation of the + button by giving the tactile guidance to the fingertip operating the + button. It should be noted that the − button 1505b and the auto-exposure setting area 1506 are similarly configured.

Next, descriptions will be provided for how the user interface for the digital camera remote control function of the personal digital assistant 3 works when the slider of the zoom is operated.

The slider 1504a staying at the center of the slide bar 1504b in the zoom operation area indicates that the drive of the zoom is halted. When the slider 1504a is operated upward, the zoom is driven toward telephoto. When the slider 1504a is operated downward, the zoom is driven toward wide angle. In other words, when the slider 1504a is shifted to an arbitrarily-selected position on the slide bar 1504b by the slide operation, the slider 1504a moves to an operational position. According to the operational position, an instruction on the zoom driving speed is outputted for the operational time length. Thereby, the zoom driving speed changed according to the operational position. As the slider 1504a becomes closer to the center of the slide bar 1504b, the zoom driving speed becomes slower. When the slider 1504a is operated to a position farther from the center of the slide bar 1504b, the zoom is driven at faster speed. Once the finger gets out of contact with the slider 1504a while the zoom is being driven by the slide operation, the slider 1504a returns to the center of the slide bar 1504b, and the drive of the zoom comes to a halt.

The slider 1504a, the slide bar 1504b and the operation guide portion 1504c in the zoom operation area normally stay flat. Once the user selects the slider 1504a by the touch operation, the operation guide portion 1504c is deformed into the convex shape. Thereby, the convex shape is generated surrounding the slide bar 1504b. This makes it possible to inform the user of a range in which the zoom can be driven by the slide operation by giving the tactile guidance to the fingertip operating the slider. In addition, since the convex shape is formed in the place beyond which the effect of operating the slider is nullified, the user will have difficulty operating the slider beyond the convex shape. Accordingly, the user can drive the zoom smoothly.

Furthermore, the center of the slide bar 1504b may be also deformed into the convex shape in order to inform the user that the directions in which the slider is operated become reverse at the center of the slide bar 1504b by giving the tactile guidance to the fingertip.

In addition, when the zoom driven toward telephoto in response to the upward sliding of the slider 1504a eventually reaches the telephoto end, the slider 1504a may be deformed in the convex shape in the same manner as is the foregoing + button when continuing being operated by the long press even after the focus is driven to the infinity end. To put it specifically, since the slider 1504a moves while following the fingertip, the slider 1504a at the position of the fingertip changes into the convex shape. Thereby, the user can be informed that the zoom can no longer be driven in response to the user's operation of the slider by giving the tactile guidance to the fingertip operating the slider. Incidentally, this is the case with the driving of the zoom toward wide angle as well.

What is more, when the slider in the focus operation area is operated, the operation guide portion 1505e works in the same manner as does the operation guide portion 1504c when the slider in the zoom operation area is operated. For this reason, descriptions for the operation guide portion 1505e will be omitted.

As described above, the shape controller (controller) informs the user by changing the shapes of the deformable parts according to the response (which means, for example, that the operation has reached the operational limit) from the instruction destination (digital camera) to the instruction given to the apparatus by the operation of the touch sensor (the driving of the zoom position or the focus position by the slide operation, or the like).

As described above, the convex shapes formed on the deformable parts can be made to function to inform the user by giving the tactile guidance to the user. Since the convex shapes formed on the deformable parts are made not only to function as buttons but also to function to inform the user by giving the tactile guidance to the user, it is possible to provide the more expressive tactile user interface.

Furthermore, although the embodiment has described the digital camera remote control function of the personal digital assistant, the embodiment is not limited to this. The same effects can be obtained from various functions of various apparatuses. For example, the same effects can be obtained from a monitor camera which is panned and tilted by using a remote controller in the same manner as the zoom and focus operations are performed.

In addition, for example, although the embodiment has been described in which the display is flat, the embodiment is not limited to this case. The same effects can be obtained from a user interface apparatus whose surface is curved and which includes deformable parts under the curved surface.

Furthermore, although the configuration for changing the shape of the tactile user interface has been described using the example where the materials expansible in response to electric signals are used, the configuration is not limited to this example. Any configuration may be used, as long as it is capable of giving the tactile guidance to the user by changing the shape of the surface of the tactile user interface. What is more, although the change in the shape has been described citing the convex shape, the change is not limited to this example. The same effects can be obtained from a concave shape, a combination of convex and concave shapes, and a configuration in which a coefficient of friction on the surface is changed by use of electric characteristics.

Moreover, although in the embodiment, the configuration for detecting the user input has been described using the example where the touch operation, the slide operation 1 and the press operation are identified using only the capacitance type touch sensor, the configuration is not limited to this example. For example, the configuration may be such as, in addition to the detection by the capacitance type touch sensor, counter electromotive current to flow in the electrode when the press operation is performed is detected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-214419, filed Oct. 30, 2015, which is hereby incorporated by reference herein in its entirety.

What is claimed is:

1. A terminal comprising:
a detector configured to detect an operation to a surface of the terminal;
a deformable part arranged in the surface and configured to be deformable;
a display configured to perform display to the surface; and
a controller configured to perform a control of the deformable part based on the detected operation so that a place in the surface is deformed in a case where a function of an icon displayed at the place in the surface by the display is not allowed for an object that is displayed by the display and dragged or to be dragged to the icon.

2. The terminal according to claim 1, wherein
the controller is configured to perform the control so that the surface is deformed into at least one of a convex shape and a shape different from the convex shape.

3. The terminal according to claim 1, wherein
the controller is configured to perform control of the display so that the displayed icon is changed in the case.

4. The terminal according to claim 1, wherein
the terminal is an image pickup apparatus, and
the image pickup apparatus includes an image pickup optical system and an image pickup element configured to receive a light from the image pickup optical system.

5. An image pickup apparatus comprising:
an image pickup element configured to receive an object light; and
a terminal defined in claim 1 which functions as a user interface of the image pickup apparatus.

6. A terminal comprising:
a display configured to perform display to a surface of the terminal;
a detector configured to detect an operation to the surface;
a deformable part arranged in the surface and configured to be deformable; and
a controller configured to control the deformable part,
wherein the controller is configured to cause the deformable part at a place to be formed into an alternating series of a first shape and a second shape different from the first shape to inform a user of invalidity with respect to the detected operation, based on the detected operation and an icon displayed at the place by the display, in a case where a function of the icon, to which an object displayed by the display is dragged, is not allowed for the object.

7. The terminal according to claim 6, wherein
the second shape is a convex shape.

8. The terminal according to claim 6, wherein
the controller is configured to cause all of the deformable part to be formed into the alternating series of the first shape and the second shape.

9. The terminal according to claim 6, wherein
the controller is configured to cause the deformable part to be formed into the alternating series of the first shape and the second shape in response to the detected operation.

10. An image pickup apparatus comprising:
an image pickup element configured to receive an object light; and
a terminal defined in claim 6 which functions as a user interface of the image pickup apparatus.

11. A terminal comprising:
a display configured to perform display to a surface of the terminal;
a detector configured to detect an operation to the surface;
a deformable part arranged in the surface and configured to be deformable; and
a controller configured to perform a control of the deformable part so that a place in the surface is deformed, in a case where the controller determines based on the detected operation that the place in the surface is to be subjected to a swipe operation for changing of images displayed at the place by the display, and the swipe operation satisfies a predetermined condition with respect to changing of attributes of the images, to notify a user of an effect with respect to the place subjected to the swipe operation.

12. The terminal according to claim 11, wherein the controller is configured to determine the place in the surface based on an estimated trace of the swipe operation.

13. The terminal according to claim 12, wherein the controller is configured to obtain the estimated trace based on a speed and a direction of the detected operation.

14. An image pickup apparatus comprising:
an image pickup element configured to receive an object light; and
a terminal defined in claim 11 which functions as a user interface of the image pickup apparatus.

* * * * *